(12) United States Patent
Fillep et al.

(10) Patent No.: US 11,149,816 B2
(45) Date of Patent: Oct. 19, 2021

(54) VEHICLE SEAT ELEMENT FOR A VEHICLE SEAT WITH A RESIDUAL SPRING TRAVEL ADJUSTMENT DEVICE

(71) Applicant: GRAMMER AG, Amberg (DE)

(72) Inventors: Johannes Fillep, Birgland (DE); Florian Schanderl, Schwarzenfeld (DE)

(73) Assignee: GRAMMER AG, Ursensollen (DE)

( * ) Notice: Subject to any disclaimer, the term of this patent is extended or adjusted under 35 U.S.C. 154(b) by 0 days.

(21) Appl. No.: 16/659,897

(22) Filed: Oct. 22, 2019

(65) Prior Publication Data
US 2020/0124131 A1    Apr. 23, 2020

(30) Foreign Application Priority Data
Oct. 23, 2018  (DE) .......................... 102018126391.0

(51) Int. Cl.
*F16F 15/12*   (2006.01)
*B60N 2/70*   (2006.01)
*B60N 2/72*   (2006.01)

(52) U.S. Cl.
CPC ........ *F16F 15/1204* (2013.01); *B60N 2/7047* (2013.01); *B60N 2/72* (2013.01); *F16F 15/1207* (2013.01)

(58) Field of Classification Search
CPC ...... F16F 15/1204; F16F 15/1207; F16F 9/54; F16F 1/3842; B60N 2/52; B60N 2/72; B60N 2/7074; F16C 1/10; B60G 15/067; B60G 15/068; B60G 2202/312; B60G 2204/128

USPC .......... 188/321.11, 297, 282.2; 280/124.145, 280/124.154; 267/220
See application file for complete search history.

(56) References Cited

U.S. PATENT DOCUMENTS

| 3,006,443 A | * | 10/1961 | Siler | ........................ F16B 43/00 |
| | | | | 403/408.1 |
| 8,998,163 B2 | | 4/2015 | Haller | |
| 2005/0051987 A1 | * | 3/2005 | Saitoh | .................... F16F 1/3873 |
| | | | | 280/124.134 |
| 2012/0269596 A1 | * | 10/2012 | Frens | ..................... B62D 17/00 |
| | | | | 411/337 |

FOREIGN PATENT DOCUMENTS

| DE | 3425442 | | 8/1987 |
| DE | 4102742 A | * | 8/1991 |
| DE | 4102742 A | * | 9/1991 |
| DE | 4102743 | * | 9/1991 |

(Continued)

OTHER PUBLICATIONS

Extended Search Report for European Patent Application No. 19203593.9, dated Mar. 18, 2020, 3 pages.

(Continued)

*Primary Examiner* — Robert A. Siconolfi
*Assistant Examiner* — San M Aung
(74) *Attorney, Agent, or Firm* — Sheridan Ross P.C.

(57) ABSTRACT

Vehicle seat element for a vehicle seat having a residual spring travel adjustment device, the vehicle seat element having a first fastening eye, it being possible to introduce the residual spring travel adjustment device into the first fastening eye and the residual spring travel adjustment device having a fastening eye insert having an eccentric hole.

6 Claims, 4 Drawing Sheets

(56) References Cited

FOREIGN PATENT DOCUMENTS

| DE | 10064681 | 7/2001 |
|----|----------|--------|
| FR | 1148088 | 12/1957 |
| JP | H01-166841 | 11/1989 |
| WO | WO 2008/054265 | 5/2008 |

OTHER PUBLICATIONS

Official Action for German Patent Application No. 102018126391.0, dated Jun. 19, 2019, 3 pages.
Official Action with Machine Translation for German Patent Application No. 102018126391.0, dated Nov. 2, 2020, 4 pages.
Official Action for India Patent Application No. 201924042537, dated Jan. 1, 2021, 7 pages.

* cited by examiner

VEHICLE SEAT ELEMENT FOR A VEHICLE SEAT WITH A RESIDUAL SPRING TRAVEL ADJUSTMENT DEVICE

CROSS-REFERENCE TO RELATED APPLICATIONS

This application claims the benefit of German Patent Application No. DE 10 2018 126 391.0 filed Oct. 23, 2018, the entire contents of which are incorporated herein by reference.

FIELD

The present invention relates to a vehicle seat element for a vehicle seat having a residual spring travel adjustment device, the vehicle seat element having a first fastening eye.

BACKGROUND

Residual spring travel adjustment devices are known from the prior art in which the spring or the damper, which is usually connected to two relatively oscillating elements of the vehicle seat, is adjusted by means of a fluidic adjustment within the respective element. In the case of a damper, for example, the piston is driven piston further out or driven further in by means of a pressure change in the working chamber.

However, such residual spring travel adjustments are complicated and also interfere with the operation of other parameters, such as damping or suspension or height adjustment.

SUMMARY

The object of the present application is therefore to provide a vehicle seat element for a vehicle seat having a residual spring travel adjustment device by means of which the residual spring travel of the suspension or damping can be adjusted particularly easily and without interfering with the suspension or damping.

The basic idea of the present application is therefore to provide a vehicle seat element for a vehicle seat having a residual spring travel adjustment device, the vehicle seat element having a first fastening eye, the residual spring travel adjustment device being introducible into the first fastening eye and the residual spring travel adjustment device having a fastening eye insert having an eccentric hole.

This means that the vehicle seat element comprises a first fastening eye into which the residual spring travel adjustment device can be introduced. Furthermore, the fastening eye insert has an eccentric hole, that is, the hole that is present is not located centrally in the fastening eye insert, but is displaced by a distance or an offset with respect to the centre of the fastening eye insert.

It is conceivable, for example, for the vehicle seat to be at least one selected from a spring element, a damping element, a level control element, or a combination thereof. In this case, an element for detecting a current seat height of the vehicle seat with output of information, for example, that the seat is too high or too low, and/or actions depending on said height, such as direct actuation of an outlet valve if the seat is too high, is located under the level control element.

The setting of the residual spring travel can be changed by means of various forms of introduction of the fastening eye insert into the first fastening eye or by displacing the fastening eye insert relative to the first fastening eye.

According to a particularly preferred embodiment, therefore, the fastening eye insert is displaceable in a circumferential direction relative to the fastening eye.

In particular, this means that, when the fastening eye insert is displaced relative to the first fastening eye, the hole is also displaced in the circumferential direction due to its eccentric design, that is, the distance between the eccentric hole and the vehicle seat element changes.

In this case, the circumferential direction relates in particular to the fact that the fastening eye insert is circular in at least one direction when viewed in a section.

In particular, according to a preferred embodiment, it is advantageous if the fastening eye insert is cylindrical. Accordingly, it is also advantageous if the first fastening eye is also cylindrically shaped, in particular complementarily to the fastening eye insert, the fastening eye insert being, at least in part, enclosed by the fastening eye.

In the event of a displacement of the fastening eye insert with respect to the fastening eye, the cylindrical portion of the fastening eye insert rotates within the cylinder of the fastening eye.

The fastening eye insert can be displaced in different ways with respect to the fastening eye.

In this case, according to a preferred embodiment, the fastening eye insert has two projections that extend in the radial direction and engage in complementarily shaped grooves of the fastening eye.

If the projections engage in the respective grooves, it is initially not possible for the fastening eye insert to be displaced with respect to the fastening eye. The connection between the projections and the grooves must first be released such that the fastening eye insert can be displaced with respect to the fastening eye, meaning in this case in particular that the fastening eye insert can be rotated to the right or to the left in the circumferential direction within the fastening eye.

According to a further embodiment, the fastening eye has at least four grooves, two grooves each being considered to be a pair and being opposite to each other, and another pair formed by two further grooves being arranged at an angle relative to each other in the circumferential direction. Particularly advantageously, two grooves are arranged at an angle of 90° relative to each other. By releasing the connection of projections and grooves and then rotating the fastening eye insert to the right or to the left in the circumferential direction and towards the nearest grooves or the nearest pair of grooves, resulting in the subsequent engagement of the projections in these new grooves, the eccentric hole has also accordingly been displaced in the circumferential direction and has accordingly changed the residual spring travel of the vehicle seat element.

By providing four grooves in particular, three states can be taken up that are designated the first state, the second state and the third state. In this case, the first state is the state in which the eccentric hole is closest to the vehicle seat element, and the third state is the state in which the eccentric hole is farthest from the vehicle seat element. The second state corresponds to an intermediate state between the first state and the third state. In particular, a displacement path towards the first state or the third state is the same.

It is of course also conceivable for a plurality of grooves to be provided on the fastening eye in order to adjust a finer gradation of the distance between the eccentric hole and the vehicle seat element.

According to a particularly preferred embodiment, the projections are arranged at an angle of 180° relative to each other. This makes it possible for the fastening eye insert to attain a particularly secure hold within the fastening eye when the projections engage in the grooves.

According to a further preferred, further embodiment, a fine toothing is formed between the fastening eye and the fastening eye insert. By means of fine toothing, it is possible to achieve precise displacement of the fastening eye insert with respect to the fastening eye. The displacement is correspondingly performed, as in the previous embodiment, by releasing the connection between the fastening eye and the fastening eye insert; rotating the fastening eye insert with respect to the fastening eye; inserting the fastening eye insert into the fastening eye. This embodiment is similar to the previously described embodiment but differs in that a finer displacement of the fastening eye insert with respect to the first fastening eye can be achieved.

According to a further alternative and preferred embodiment, a worm gear is provided, the worm wheel being formed on the fastening eye insert and the worm being arranged in the fastening eye. Therefore, by actuating the worm wheel by means of the worm, the fastening eye insert can be rotated in the circumferential direction within the fastening eye. As a result, stepless adjustment or displacement of the fastening eye insert is accordingly realised with respect to the fastening eye. On the one hand, the worm can be driven manually by a person, it also being possible for the worm to be connected to an electric motor that actuates or drives the worm based on the person's requirements.

In particular, it is advantageous if the residual spring travel adjustment device be operated solely mechanically and manually.

Likewise, the underlying object is achieved by a method for adjusting a residual spring travel of a vehicle seat element for a vehicle seat, comprising the following method steps:
a) detaching the fastening eye insert from the fastening eye;
b) rotating the fastening eye insert to the left or right in the circumferential direction by a first angle;
c) introducing the fastening eye insert into the fastening eye.

Further advantageous embodiments result from the dependent claims.

BRIEF DESCRIPTION OF THE DRAWINGS

Additional objects, advantages and expedient uses of the present invention can be found in the following description in conjunction with the corresponding drawings. In the drawings.

DETAILED DESCRIPTION

Figure 1:
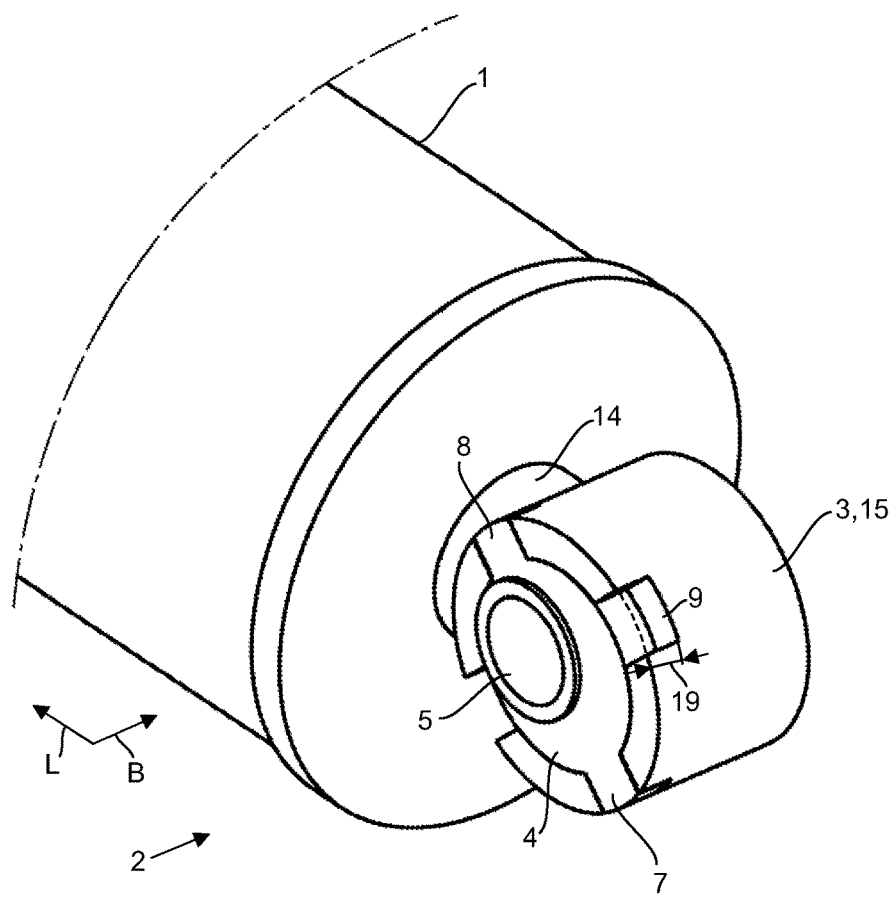
FIG. 1 shows a vehicle seat element having a residual spring travel adjustment device according to a preferred embodiment in a perspective view.

In the figures, the same components are denoted by the same reference numerals, it being possible for the reference numerals to be omitted in some figures for clarity.

FIG. 1 shows a vehicle seat element 1 in a perspective view, a first fastening eye 3 being arranged on the vehicle seat element 1. In particular, a fastening element 14 can be provided, by means of which the first fastening eye 3 is connected to the vehicle seat element 1. In this case, the fastening eye 3 is cylindrical and has an outer surface 15 and an inner surface 16. In particular, the first fastening eye 3 is circular in a cross section with a cylinder ring having a finite extent. It can also be seen that the first fastening eye 3 has grooves 9 into which the projections 7, 8 of the fastening eye insert 4 of the residual spring travel adjustment device 2 can engage. The arrangement and the configuration of the projections 7, 8, as well as the grooves 9, are shown in more detail in the following figures. Furthermore, the fastening eye insert 4 has an eccentric hole 5, that is, the hole is not located centrally in the fastening eye insert 4, but is displaced by a certain distance with respect to the centre of the fastening eye insert 4. The centre of the fastening eye insert 4 can be formed, for example, by the central axis or axis of rotation.

Figure 2:
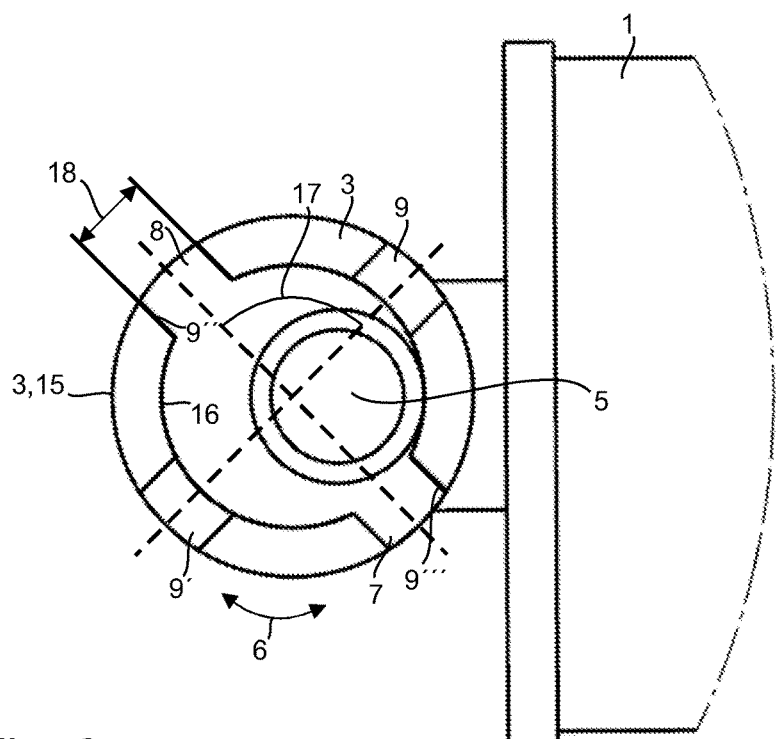
FIG. 2 shows the vehicle seat element according to FIG. 1 in a side view.

FIG. 2 shows the vehicle seat element 1 in a side view. As can be seen, the fastening eye 3 has a total of 4 grooves 9, 9', 9" and 9''', the grooves being arranged in pairs, that is, the grooves 9 and 9' are arranged oppositely in the radial direction of the fastening eye 3 and the next pair of grooves 9" and 9m are also arranged oppositely. Furthermore, the first pair of grooves 9, 9' and the second pair of grooves 9", 9''' are offset by an angle 17. In this case, the angle 17 is, according to a preferred embodiment, 90°. If the fastening eye insert is inserted into the first fastening eye 3, the projections 7, 8 engage in a pair of grooves 9, 9' or 9", 9'''. In the present case, the projections 7, 8 engage in the grooves 9" and 9m. If the fastening eye insert 4 is removed from the fastening eye 3 and subjected to rotation, preferably to the left or right in the circumferential direction 6, and then introduced back into the fastening eye 3, in particular into a pair of grooves 9, 9', 9", 9''', the eccentric hole 5 will also have been rotated in the circumferential direction. Accordingly, three different states are recognisable, the first state being shown in FIG. 2, the first state in this case describing the fact that the eccentric hole is located closest to the vehicle seat element 1. Another state, in particular the second state, describes a central position of the eccentric hole. In this case, the projections 7, 8 are in contact with the grooves 9, 9'. Furthermore, a third state is possible, the first state, in which the projections 7, 8 engage in the grooves 9" and 9''', likewise engaging in the same grooves 9", 9''' again, the grooves 7, 8, however, being rotated 180° in the circumferential direction 6. This third state describes the fact that the eccentric hole 5 is now farthest from the vehicle seat element 1.

As can also be seen from FIGS. 1 and 2, the projections 7, 8, as well as the grooves 9, 9', 9", 9''' shaped complementarily thereto, have a defined width 18 or a defined depth 19.

Figure 3:
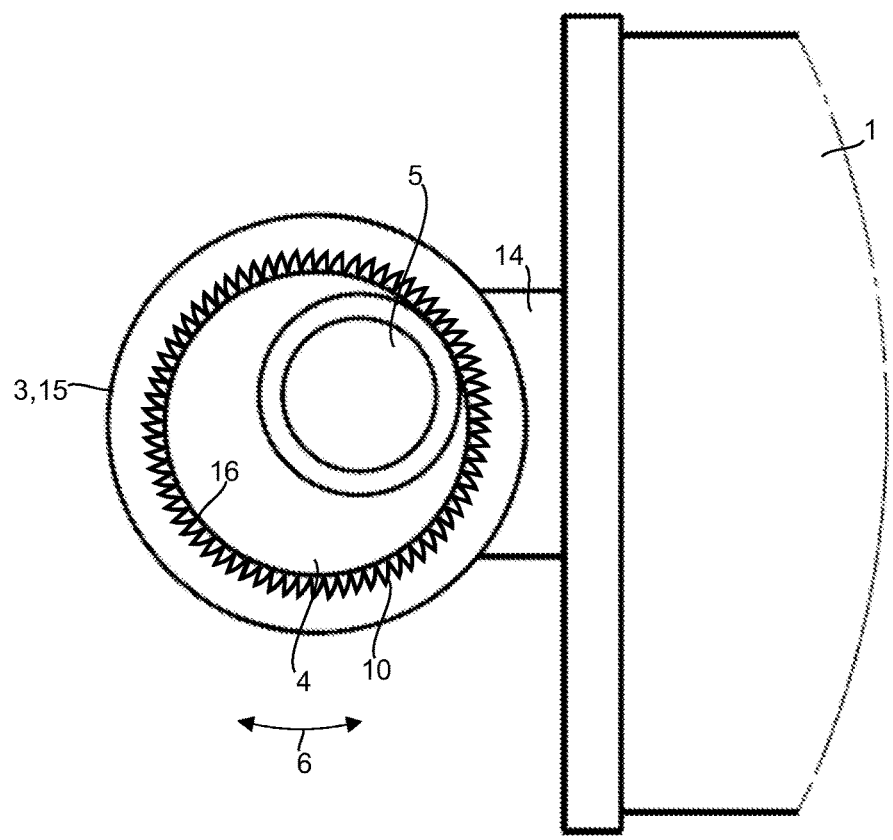
FIG. 3 shows a vehicle seat element having a residual spring travel adjustment device according to a further embodiment.

FIG. 3 shows a further embodiment of the fastening eye insert 4 being brought into contact with the first fastening eye 3. As can be seen, fine toothing 10 is formed between the fastening eye insert 4 and the first fastening eye 3. In particular, the fine toothing 10 is formed between the fastening eye insert 4 and the inner surface 16 of the first fastening eye 3. In this case, the fastening eye insert 4 can be displaced with respect to the first fastening eye 3, as shown in the embodiment in FIG. 2. First, the fastening eye insert 4 is removed from the first fastening eye 3 and subsequently rotated to the left or right in the circumferential direction 6 by a desired angle and then introduced back into the first fastening eye 3. In this case, the fine toothing 10 makes very precise adjustment of the position of the eccentric hole 5 possible.

Figure 4:
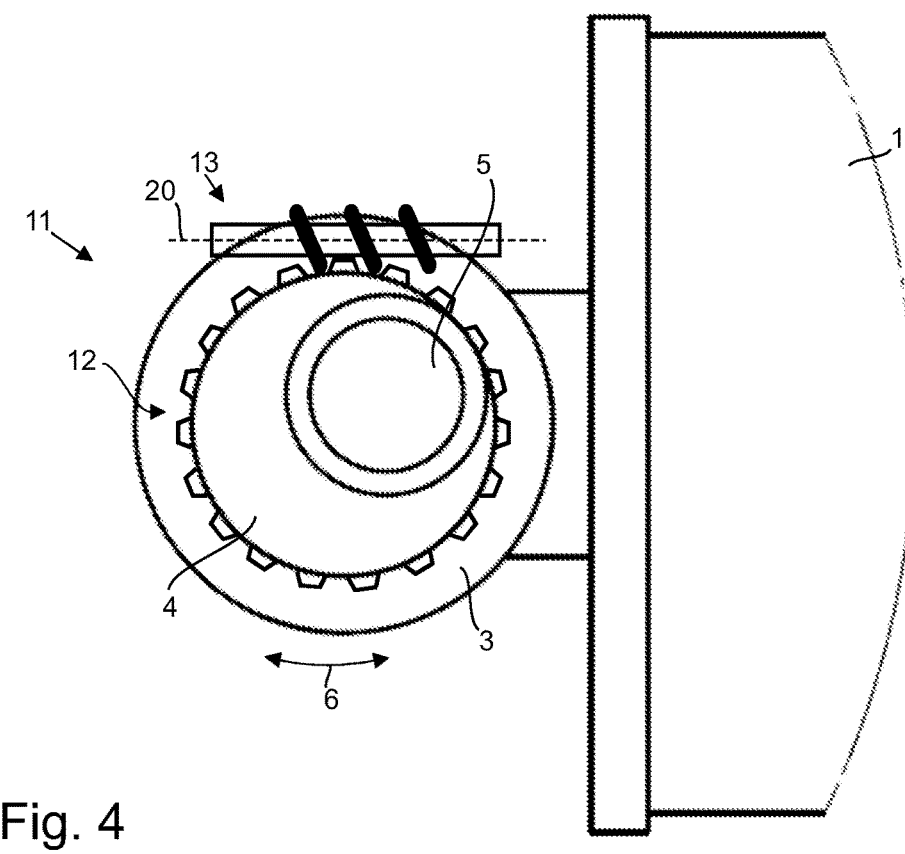
FIG. 4 shows a vehicle seat element having a residual spring travel adjustment device according to a further embodiment.

FIG. 4 shows a further embodiment, the fastening eye insert 4 being designed as a worm wheel 12 that is in contact with a worm 13, the worm 13 being connected to the first fastening eye 3 so as to be rotatable about a first axis of rotation 20. By actuating the worm, that is, by rotating the worm 13, the worm wheel 12 is driven and the fastening eye insert 4 is displaced to the left or right in the circumferential direction 6 relative to the first fastening eye 3. By rotating the worm wheel 12 by means of the worm 13, as well as according to the other embodiments, the eccentric hole 5 is displaced relative to the first fastening eye 3.

Figure 5A:
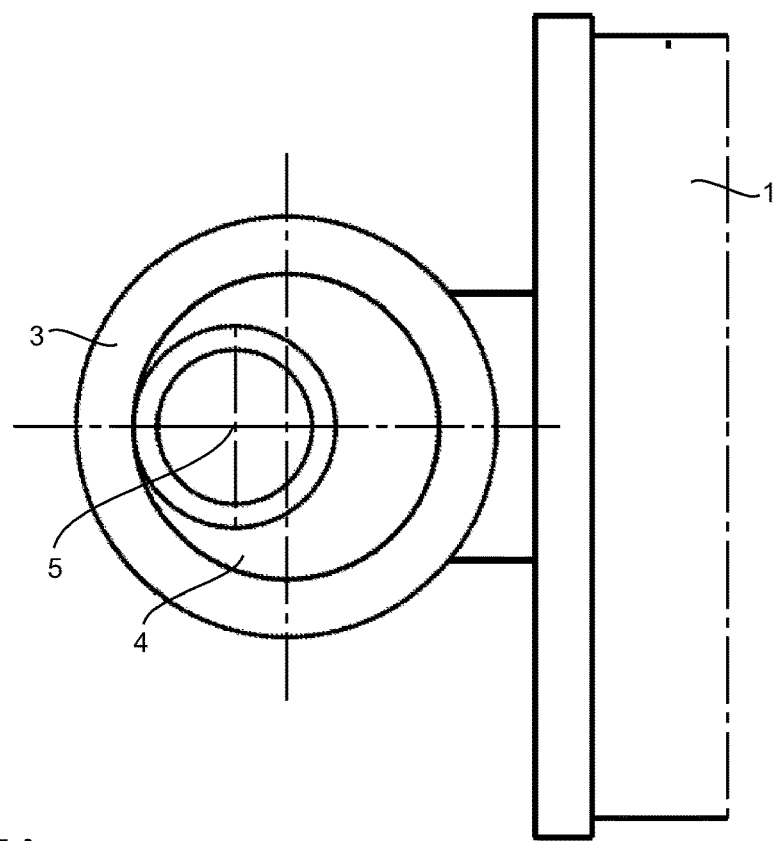
FIG. 5A shows the vehicle seat element having a residual spring travel adjustment device in a third state.
Figure 5B:
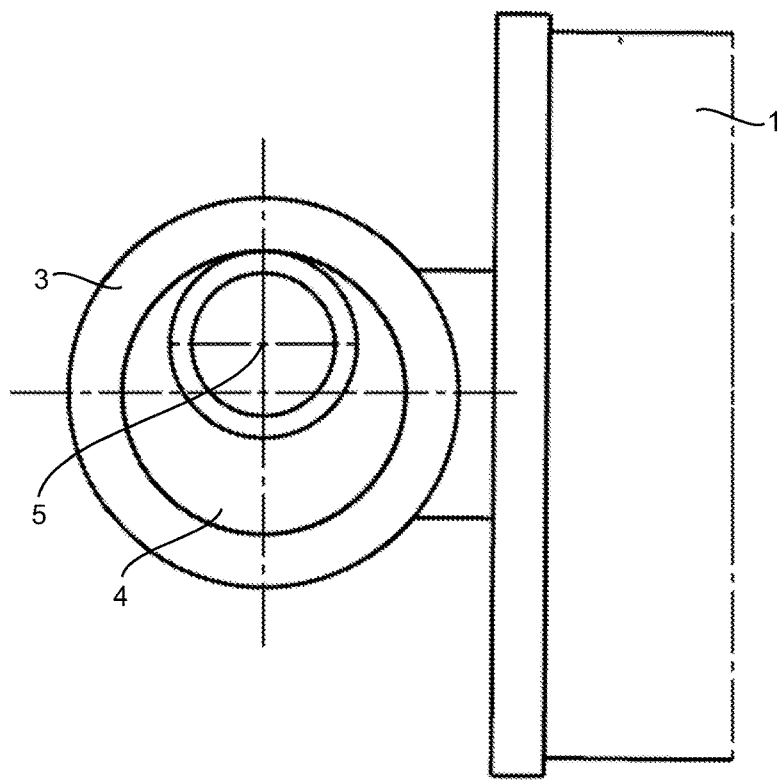
FIG. 5B shows the vehicle seat element having a residual spring travel adjustment device in a second state.
Figure 5C:
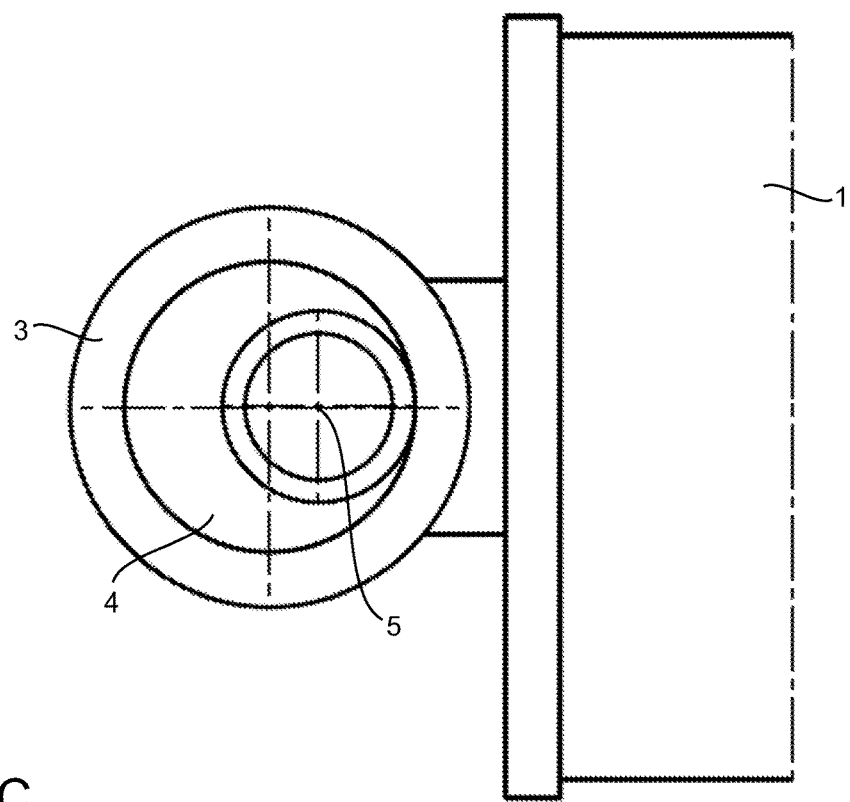
FIG. 5C shows the vehicle seat element having a residual spring travel adjustment device in a first state.

The various essential states are shown again in FIGS. 5A, 5B and 5C. FIG. 5A shows the third state, in which the eccentric hole 5 is farthest away from the vehicle seat element 1. By contrast, FIG. 5C shows the first state, in which the eccentric hole 5 is located closest to the vehicle seat element 1. FIG. 5B shows an intermediate state in which the eccentric hole is located in a central position that is between the first state in FIG. 5A and the third state in FIG. 5C, in particular centrally between these states. These states can be taken up independently of the selected embodiment.

Figure 6:
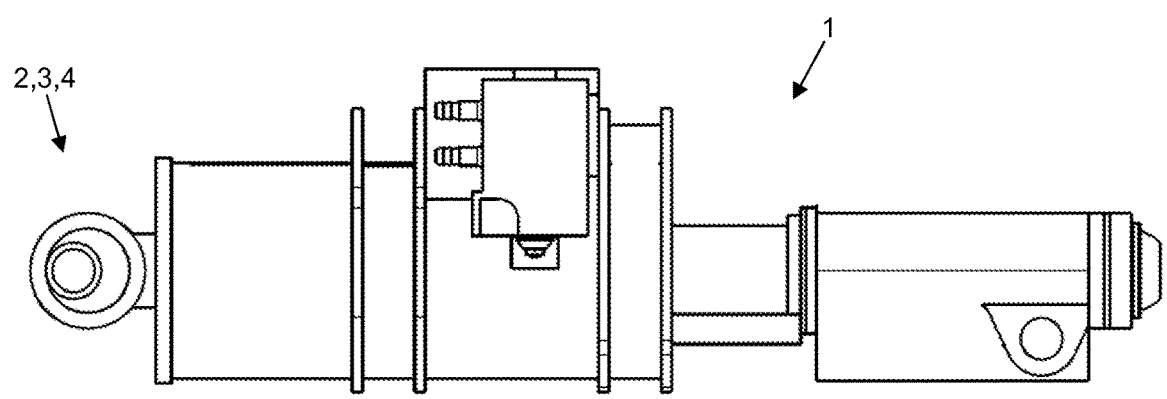
FIG. 6 shows the vehicle seat element having a first fastening eye.

FIG. 6 schematically shows an embodiment having a vehicle seat element 1. This is, in particular, a linear controller of the vehicle seat element 1, which is designed as a level controller according to the FIG. 6.

Moreover, it is also conceivable that a second fastening eye is provided that also has a residual spring travel adjustment device 2 having a fastening eye insert 4. The embodiments of the second fastening eye as well as the residual spring travel adjustment device and the fastening eye insert can be designed in a similar way to the first fastening eye and as described above.

All the features disclosed in the application documents are claimed as being essential to the invention, provided that, individually or in combination, they are novel over the prior art.

LIST OF REFERENCE SIGNS 1 vehicle seat element
2 residual spring travel adjustment device
3 first fastening eye
4 fastening eye insert
5 eccentric hole
6 circumferential direction
7 first projection
8 second projection
9 groove
9' groove
9" groove
9''' groove
10 fine toothing
11 worm gear
12 worm wheel
13 worm
14 fastening element
15 outer surface
16 inner surface
17 angle
18 width
19 depth
20 axis of rotation

What is claimed is:

1. A vehicle seat element for a vehicle seat having a residual spring travel adjustment device, the vehicle seat element having a first fastening eye, wherein the residual spring travel adjustment device can be introduced into the first fastening eye and the residual spring travel adjustment device has a fastening eye insert having an eccentric hole, wherein the fastening eye is cylindrical, and wherein the fastening eye insert has two projections extending in a radial direction that engage in complementarily shaped grooves of the first fastening eye.

2. The vehicle seat element for a vehicle seat according to claim 1, wherein the fastening eye insert is displaceable in a circumferential direction relative to the first fastening eye.

3. The vehicle seat element for a vehicle seat according to claim 1, wherein the two projections are arranged at an angle of 180° relative to each other.

4. A vehicle seat element for a vehicle seat having a residual spring travel adjustment device, the vehicle seat element having a first fastening eye, wherein the residual spring travel adjustment device is introduced into the first fastening eye and the residual spring travel adjustment device has a fastening eye insert having an eccentric hole, wherein the fastening eye insert is cylindrical, wherein a first fine toothing is formed on the first fastening eye, wherein a second fine toothing is formed on the fastening eye insert, and wherein the first fine toothing of the first fastening eye engages with the second fine toothing of the fastening eye insert.

5. A vehicle seat element for a vehicle seat having a residual spring travel adjustment device, the vehicle seat element having a first fastening eye, wherein the residual spring travel adjustment device can be introduced into the first fastening eye and the residual spring travel adjustment device has a fastening eye insert having an eccentric hole, wherein the fastening eye insert is cylindrical, and wherein a worm gear is provided, a worm wheel of the worm gear being formed on the fastening eye insert and a worm of the worm gear being arranged in the first fastening eye.

6. A method for adjusting a residual spring travel of the vehicle seat element for the vehicle seat according to claim 1, comprising the following method steps:
    detaching the fastening eye insert from the first fastening eye;
    rotating the fastening eye insert in a circumferential direction by a first angle; and
    introducing the fastening eye insert into the first fastening eye.

* * * * *